May 4, 1926.
O. C. SCHMIDT
MEAT CUTTING MACHINE
Filed Nov. 7, 1923
1,583,755
4 Sheets-Sheet 1
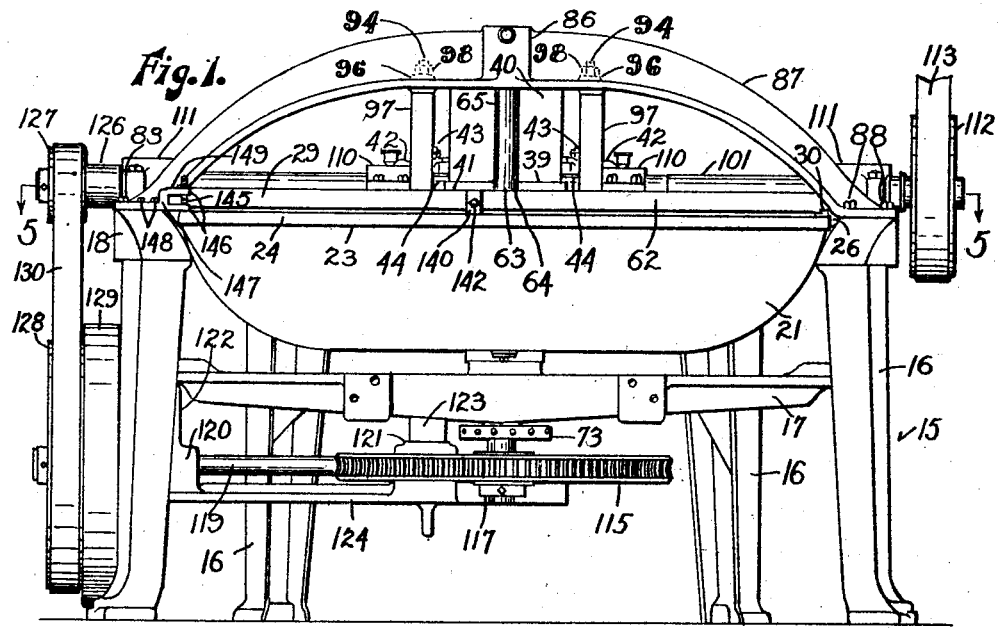
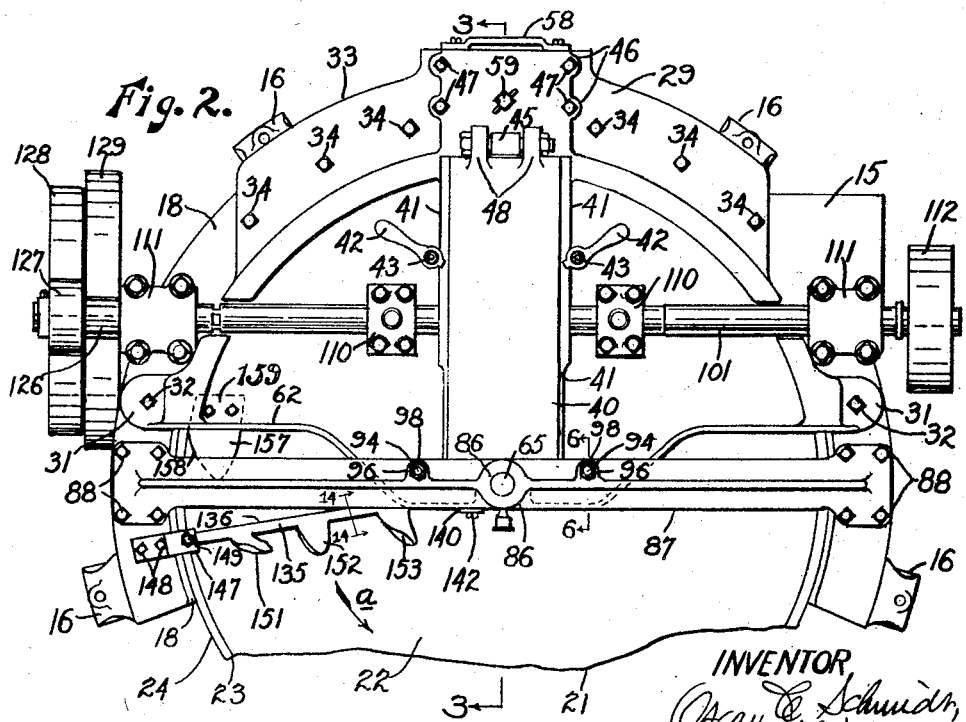
INVENTOR May 4, 1926.
O. C. SCHMIDT
MEAT CUTTING MACHINE
Filed Nov. 7, 1923.    4 Sheets-Sheet 2
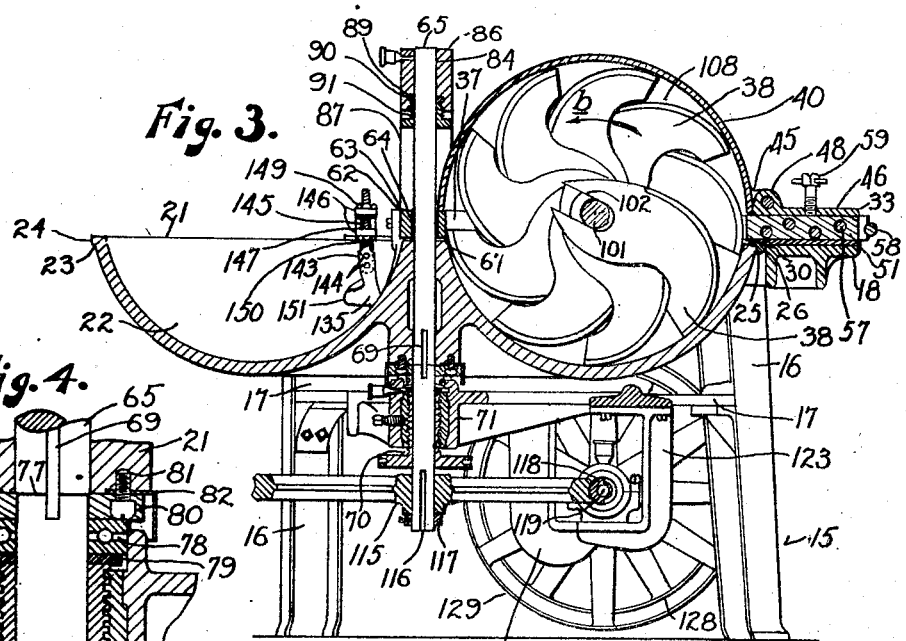
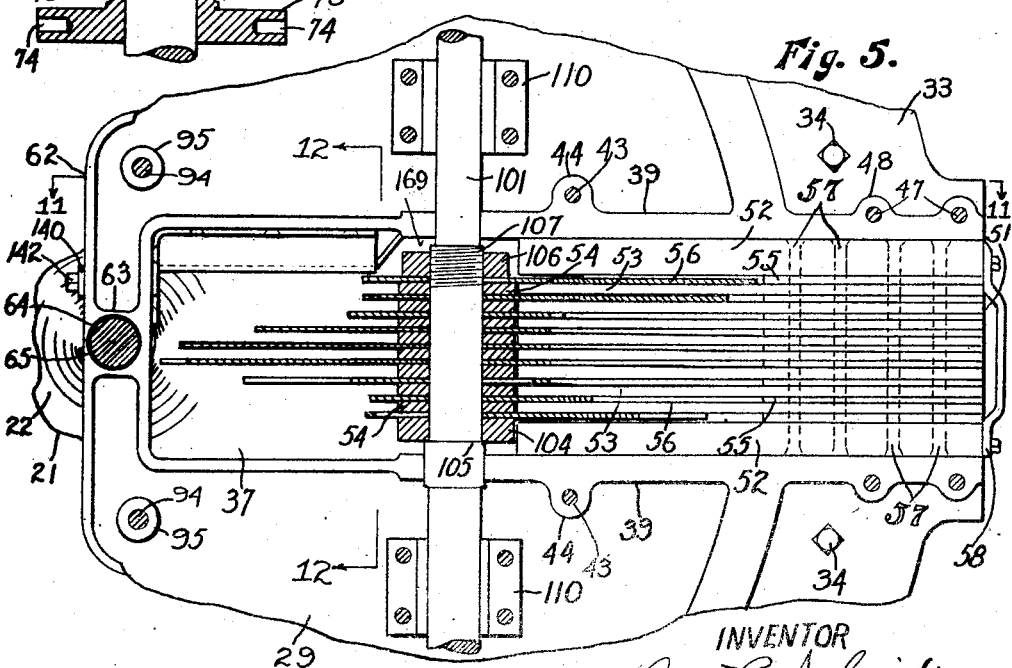
INVENTOR
Oscar C. Schmidt,
by his attorney

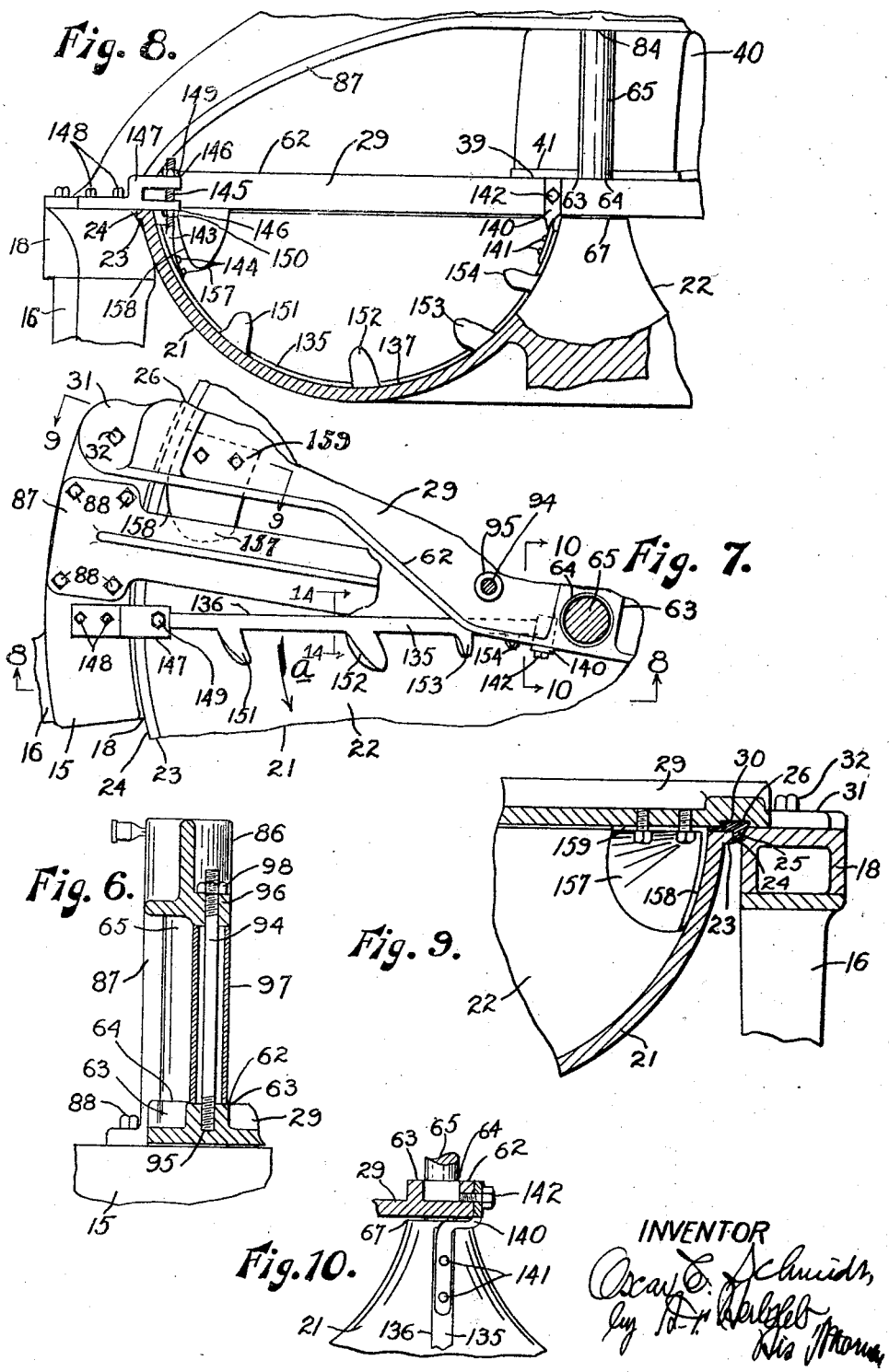

May 4, 1926.
O. C. SCHMIDT
1,583,755
MEAT CUTTING MACHINE
Filed Nov. 7, 1923
4 Sheets-Sheet 4
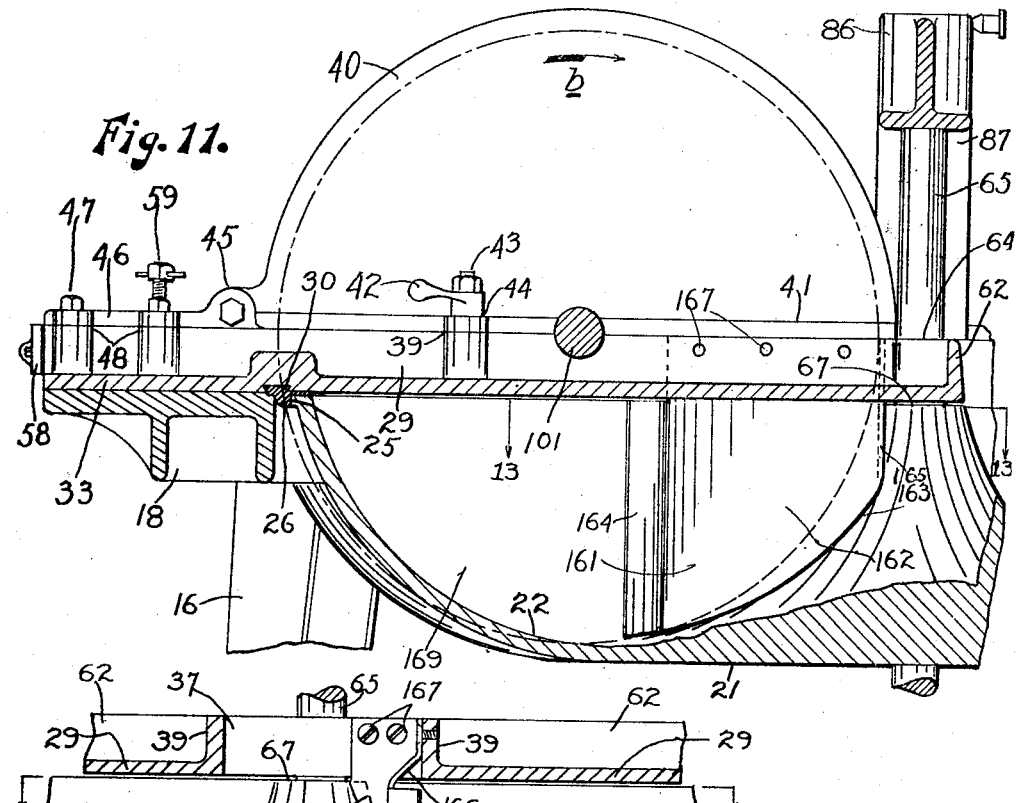
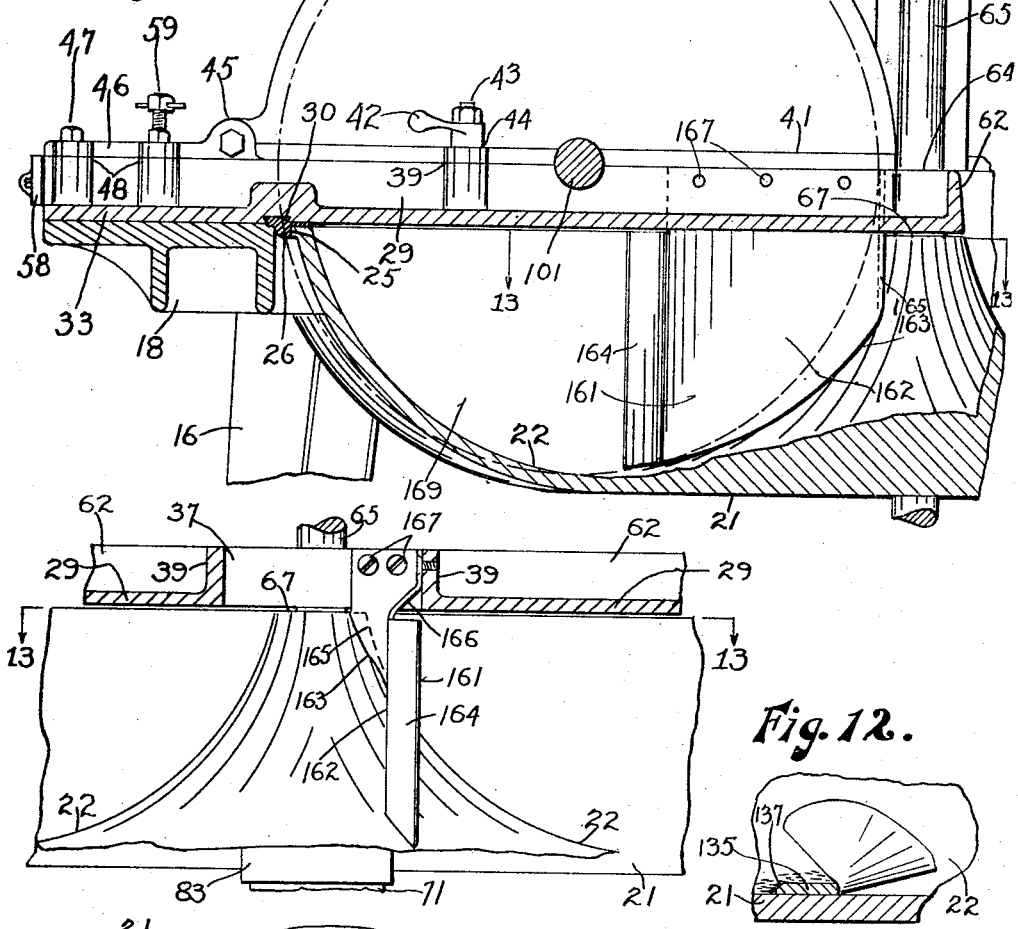
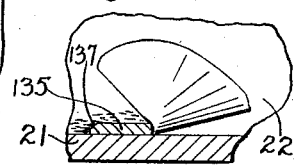
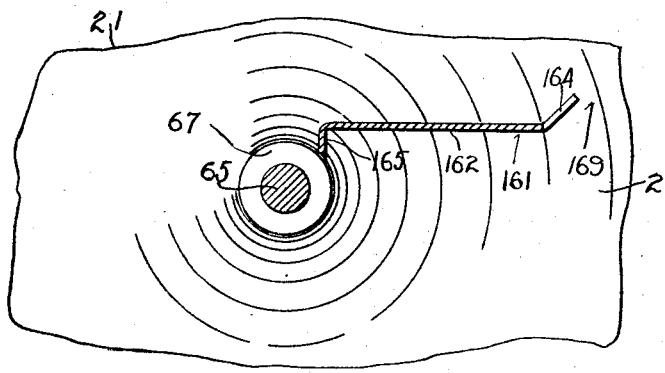
INVENTOR Patented May 4, 1926.

1,583,755

UNITED STATES PATENT OFFICE.

OSCAR C. SCHMIDT, OF CINCINNATI, OHIO, ASSIGNOR TO THE CINCINNATI BUTCHERS' SUPPLY COMPANY, OF CINCINNATI, OHIO, A CORPORATION OF OHIO.

MEAT-CUTTING MACHINE.

Application filed November 7, 1923. Serial No. 673,351.

*To all whom it may concern:*

Be it known that I, OSCAR C. SCHMIDT, a citizen of the United States, residing at Cincinnati, in the county of Hamilton and State of Ohio, have invented certain new and useful Improvements in Meat-Cutting Machines, of which the following is a specification.

My invention relates to meat cutting machines wherein the meat or meat-dough, hereinafter for convenience called meat, is received in a rotating bowl, having an annular meat-containing trough, rotating knives operating upon the meat crosswise of the trough to cut the same into small pieces or fine particles suitable for meat loaves, sausage meat, or other mixtures.

It is the object of my invention to provide a meat cutting machine with a rotating bowl having an annular meat-receiving trough so arranged that the front of the bowl is free of obstruction for loading and discharging the meat, while the middle of the bowl is formed as a shaft-receiving hub of frusto-conoidal form, with the rotating knives located in rear of said shaft-receiving hub to remove them from the loading and unloading portion of the bowl and to provide a protecting wall between said knives and said latter portion of the bowl; further, to provide means whereby the bowl-shaft extends upwardly through said bowl and is provided with a bearing above the bowl; further, to provide oiling means for the shaft above and removed from the bowl and so arranged as to arrest passage of oil into the bowl; further, to provide a cover for the rear portion of said bowl to retain the meat contents in the bowl; further, to provide a frame in which the bowl rotates and a cross-brace above the bowl connecting with the sides of said frame for providing rigidity for the frame in order to maintain the joint between the upper edge of said bowl and said frame; further, to support the front portion of said cover by means of said cross-brace; further, to provide novel means for mixing the meat in said bowl; further, to provide novel means for directing the meat away from the outer edge of the bowl and for mixing the meat in said bowl between said outer edge and the inner portion of the bowl while rotating the bowl; further, to provide means for adjusting the relative speeds of rotation between the bowl and the cutters; further, to provide novel means whereby the meat or its ingredients and especially the fatty portions thereof are freed from the bottom of the bowl during rotation of the bowl; and, further, to provide means whereby the contents of the bowl are separated from the bottom of the bowl and the adhering bottom portions of the body of the meat are shifted into said body in order to mix the meat being operated on.

It is the object of my invention, further, to provide deflecting means at the inner edge of the trough so arranged as to deflect the meat from the inner edge of the trough outwardly; further, to provide such deflecting means arranged to scrape the inner wall of the annular trough and to deflect the finely cut inner portions of the meat outwardly and mix the same with the more coarsely cut outer portions of the meat; further, to so arrange the cutters that they act upon the meat to advance the meat toward said deflecting means and aid in moving the meat laterally toward the edge of said deflecting means; further, to provide means in adjacency to the cutters for deflecting the meat outwardly, means removed from the cutters for deflecting the meat inwardly, means for turning over portions of the meat body, and means for scraping the bottom of the annular trough, for conditioning the meat.

The invention will be further readily understood from the following description and claims, and from the drawings, in which latter:

Fig. 1 is a front elevation of my improved device.

Fig. 2 is a plan view of the same, with the front portion of the bowl broken away.

Fig. 3 is a vertical cross-section of the same, taken in the plane of the line 3—3 of Fig. 2.

Fig. 4 is an enlarged detail in vertical cross-section of the bowl adjusting means, taken on the same section line.

Fig. 5 is a horizontal section of the knife portion of my improved device, taken in the plane of the line 5—5 of Fig. 1, and partly broken away.

Fig. 6 is a detail of the cover-support in vertical cross-section, taken on the line 6—6 of Fig. 2.

Fig. 7 is a plan view of a detail of my improved device, partly broken away, illustrating the mixing means for the meat.

Fig. 8 is a vertical cross-section of the same, taken in the plane of the line 8—8 of Fig. 7.

Fig. 9 is a detail in cross-section of the same, taken in the plane of the line 9—9 of Fig. 7.

Fig. 10 is a detail in cross-section of the same, taken in the plane of the line 10—10 of Fig. 7.

Fig. 11 is a cross-section of my improved device, taken on the line 11—11 of Fig. 5, partly broken away, to illustrate the inner deflector.

Fig. 12 is a cross-section of the same, taken on the line 12—12 of Fig. 5.

Fig. 13 is a horizontal section of the same, taken on the line 13—13 of Fig. 11; and, Fig. 14 is a cross-sectional detail showing the deflector at the outer rim of the bowl, taken on the line 14—14 of Fig. 7.

The frame 15 of my improved device comprises legs 16 and an inner spider 17 fixed to the legs, the legs supporting the sector 18 of a ring at the tops thereof for connecting the upper ends of the legs and forming a sector-member within which the bowl is received.

The bowl 21 is provided with an annular trough 22, which is a meat-receiving trough, in which the meat is contained and reduced. The trough is arc-shaped in cross-section. The outer rim 23 of the bowl is provided with an annular face 24 which coacts with a complemental face 25 on a bearing-sector 26 for said outer edge, to form a joint at the sides and rear of the bowl to prevent seepage or leakage of the meat and its juices over the edge of the bowl.

A cover 29 is received above the bowl. The bearing-sector 26 is fixed to the under face of said cover, as by a dove-tail joint 30, and preferably extends throughout the lower face of said cover to form a close running joint between the outer peripheral edge of said bowl and the lower face of said cover throughout the extent of the latter. The cover is preferably secured to the sector-member 18 of the main frame by having lugs 31 supported by said sector-member and secured thereto by bolts 32 and being provided with an arcuate flange 33 supported by said sector-member and secured thereto by bolts 34.

The cover is provided with an opening 37 through which the knives 38 operate in the cutting operation. The wall of the opening is provided with a flange 39. A hood 40 for the knives is received over said knives and is provided with flanges 41. Latches 42 are pivoted on bolts 43 in bearings 44 in the flange 39 and are arranged to be received over the flanges 41 of the hood for fastening the hood in place. The hood is pivoted by means of a hinge 45 to a plate 46, fixed to the cover by bolts 47, threaded in threaded bearings 48 in the flange 33.

A comb 51 is received in said opening and preferably comprises side filling-pieces 52 at the respective sides of the knives. Teeth 53 are received in the spaces between the knives, their inner ends substantially meeting the outer peripheries of the collars 54 between the knives. Spacing strips 55 are located between the bases of the teeth and form spaces 56 between the inner ends of the teeth in which the knives operate. The side filling-pieces, the teeth and the spacing strips are preferably connected together by rivets 57 to form a rigid comb. The comb is slidable into the opening from the rear, as by manipulation with a handle 58 thereon, the comb being fixed in place by a set-screw 59 threaded into the plate 46.

The forward end of the cover is provided with a strengthening flange 62. This flange is an upturned flange and directs the meat into the bowl and depresses and spreads it crosswise of the trough. At the middle forward portion of the cover there is a boss 63, provided with a hole 64, in which a shaft 65 is loosely located. This boss is shown as merging into the flange formed at the wall of the opening 37 and into the flange 62 at the front of the cover.

The bowl is provided with an inner raised hub 67, preferably of frusto-conoidal form, the side of which is formed as part of the inner or bottom face of the meat-trough, the rotating knives coacting therewith in cutting the meat, thereby increasing the cutting surface. This hub and coacting meat-supporting surface thereof preferably surround the shaft. The frusto-conoidal portion surrounding the shaft forms a shield between the knives and the operator, whose position is at the front of the machine, and is an element of safety in the machine and aids in forming a closed channel in which the knives operate. The cover 29 is received above this hub. The boss 63 of the cover is in line with the hub 67, the shaft being received loosely through both.

The upright shaft 65 has the bowl fixed thereto for rotation therewith, as by means of a key-connection 69. The shaft rotates in a bearing-sleeve 70 adjustable up and down in a bearing 71, with which it has screw-connection 72, a flange 73 of said bearing-sleeve being provided with holes 74 for reception of a suitable pin-wrench for rotating the bearing-sleeve. The bearing-sleeve is arranged to be locked in adjusted positions by means of a block 75 received in said bearing 71 and clamped against the bearing-sleeve by means of a set-bolt 76. The shaft is provided with a shoulder 77 rigid therewith. There is a thrust-bearing 78, shown as a ball-bearing, between said shoulder and the upper end of said bearing-sleeve, a washer 79 being shown interposed between said ball-bearing and the upper end of said bearing-sleeve. The bearing 71 is a part of the spider 17 which connects with the legs of the frame and is rigid therewith. The bowl rests on the ball-bearing.

The bowl is secured to the shaft and has support on the ball-bearing, accomplished by providing the shaft with a collar 80 abutting the shoulder 77, integral with or fixed to the shaft, bolts 81 fixing said flange to the lower end of the hub-portion 82 of the bowl received about the shaft. A dust-guard 83 may surround the ball-bearing.

Adjustment of the bowl is principally for the purpose of forming a sufficiently tight joint between the upper end of the outer periphery of the bowl and the bearing-sector 26, as to prevent the seepage of meat and meat juices out of the bowl.

In order to steady the bowl in its rotation and prevent wear at said joints, and to prevent tilting of the bowl during rotation or manipulation of the meat therein, the shaft 65 is extended above the frusto-conoidal hub of the bowl and through a hole 64 in the boss 63 of the cover and into an upper bearing 86, which is shown on an arch-brace 87. This arch-brace connects with the sides of the main frame adjacent the open forward end of the sector-member 18, as by means of bolts 88, to form a rigid open-ended frame structure, which insures a tight joint between the outer rim of the bowl and the cover.

There is a gasket 89 between the lower end of said upper bearing and the shaft, being located in the socket 90 in said bearing and pressed upon said shaft by a gland 91, to retain the oil in said bearing and prevent the oil leaking or passing along the shaft and into the meat in the bowl, providing a sanitary condition. No oiling is required between the boss 63 of the cover and said shaft, as the wall of the hole 84 in said boss through which the shaft passes is out of contact with said shaft.

The front of the middle portion of the cover is also supported from said arch-brace, as by means of studs 94, the lower threaded ends of which are threaded into threaded bearings 95 in said cover, and the upper threaded ends of which are received through threaded ends 96 in said arch-brace. Spacing-bearings 97 are received and clamped between said bearings by means of nuts 98, so as to rigidly support the front end of said cover from said arch-brace.

The cutting means are shown as knives 38, which are adjustably secured to a knife-shaft 101, as by providing said knives with slots 102 in which the shaft is located. Collars 54 are located between the knives for spacing the same apart, the collars and knives being clamped to the knife-shaft between an end-collar 104 which abuts a shoulder 105 on said knife-shaft, at one end of the series of knives, and a clamp-nut 106 threaded to a threaded portion 107 of the knife-shaft. The knives are scimitar-like blades, having curved cutting edges 108, which are arranged to act upon the meat, and the paths of the outer ends of which coincide substantially to the cross-sectional form of the meat-trough.

The knives are arranged with their cutting edges one in advance of the other about the knife-shaft in order to successively cut the meat while passing therethrough, the cutting edges of the knives coacting with the bottom of the meat-trough and with the teeth of the comb 51 for dividing the meat.

The knife-shaft is journaled in bearings 110 on the cover and in bearings 111 on the sector-member 18. Suitable rotating means are provided for the knife-shaft, instanced as a pulley 112 operated by a suitable belt 113 from a suitable source of power, although other driving means may be provided.

The bowl is exemplified as rotated by a worm-wheel 115 fixed to the upright shaft 65, as by a key connection 116 and a collar 117. A worm 118 meshes with the worm-wheel and is fixed to a shaft 119 journaled in bearings 120, 121. The bearing 120 is shown on a hanger 122 depending from the spider-member 17 and the bearing 121 is shown located on a hanger 123 depending from the spider 17. A cross-piece 124 connects said bearings.

Means are provided for rotating the meat-bowl relative to the cutter-blades, preferably at different relative speeds, shown accomplished by providing the knife-shaft with pulleys 126, 127, of various sizes, complemental to pulleys 128, 129, of various sizes on the shaft 119. A belt 130 is arranged to be received over either pair of said pulleys for communicating different speeds of rotation from the knife-shaft to the shaft 119 and consequently to the meat-bowl, making the operation extremely economical and providing for maximum speed of cutting and mixing, dependent on the ingredients or quantity of meat in the bowl.

The meat in the bowl is as a matter of practice and for sanitary reasons supplied to the bowl in chilled condition, and the bowl is in practice and for sanitary reasons maintained in chilled condition during the cutting operation. As a result there is a tendency for the meat and especially for the suet, stearin, tallow, fats and congealable constituents in the meat or meat-dough to adhere to the inner face or bottom of the bowl, forming a layer on said bottom. These fatty substances thereby separate from the meat.

In order to counteract such separating tendency of the fatty substances, and to again mix the same with the meat, and to insure proper mixture of the fatty substances with the meat, I provide means for scraping the inner bottom face of the annular trough in the bowl and for urging said fatty substances among the meat constituents of the bowl, thereby permeating the meat, preventing undue leanness in the meat-dough and making it more juicy and valuable and avoiding fatty lumps in the product.

I have shown this accomplished by means of a scraper 135, exemplified as a flexible metal band, for instance of steel, of a form complemental to the cross-sectional arcuate form of the inner or bottom face of the annular meat-trough in the bowl.

The direction of rotation of the bowl is indicated by the arrow $a$, and the direction of rotation of the knife-blades is indicated by the arrow $b$.

I prefer that the edge of the scraper presented toward the approaching adhering substances in the bottom of the bowl shall be somewhat sharpened, as indicated at 136, preferably in manner to direct the layer of fatty substances away from the bottom of the bowl, as indicated for instance at 137 in Fig. 14.

The scraper is indicated as a flexible band, one end of which is provided with a holding clip 140, shown secured to the scraper-band by means of rivets 141 and as fixed to the forward flange of the cover by a bolt 142. The other end of the scraper band is provided with a clip 143, fixed to the band, as by rivets 144, and provided with a threaded shank 145. The threaded shank is adjustable in bearings 146 of a bracket 147 fixed to the main frame, as by bolts 148. Nuts 149, 150, are threaded about the shank, the shank passing loosely through said bearings.

Adjustments of the nuts along said shank cause movement of the scraper-blade toward the inner or bottom face of the meat-trough so as to hug the meat-trough, or away from said inner or bottom face so as to prevent undue friction between said flexible band and said inner or bottom face. The band is sufficiently flexible or is so formed preferably to hug said inner or bottom face throughout the width of the latter, including the face of said frusto-conoidal hub. The band is preferably radial with relation to the bowl.

Means are provided for mixing the meat in the trough to insure proper mixing of the fats throughout the body of the meat and to provide for uniform cutting thereof.

Deflectors 151, 152, 153 and 154 are provided for the purpose. These may be of suitable number and suitably placed across the meat-trough, preferably adjacent to the bottom of the same, and are shown integral with the scraper-blade. They are preferably of plow form, so as to move the meat away from the bottom and turn the same over similarly to the action of a land-plow, for the purpose of mixing the meat and of moving the fatty substances thereof into the interior of the meat-body. These deflectors deflect the meat while the latter is passing thereover along the path of its movement and the knives aid in mixing the meat in directions crosswise of said path.

The directions of rotation of the knives in the present instance have a tendency to move the body of meat toward the outer rim of the bowl. This is counteracted by the cover while the meat is under the cover. The meat is preferably deflected adjacent to the rim of the bowl toward the interior of the bowl as the meat emerges from under the cover, for which purpose a deflector 157 is provided, the outer edge 158 of which is arranged to scrape the inner face of the upper portion of the outer wall of the trough in order to deflect the meat inwardly away from said outer wall, said deflector having a deflecting face extending inwardly and in the direction of rotation of the bowl, being provided with an upper wall 159 for aiding in the deflection of the meat. This deflector acts complemental to the first-named deflectors to mix the meat.

The meat at the inner portion of the annular trough is in practice more finely divided by the knives than the meat at the outer portion of said annular trough, for the reason that there is a less body of meat at said inner portion than at said outer portion, due to the increasing diameter of the bowl, the same amount of cutting edges of the knives acting on said inner portion as on said outer portion, and there is in practice a certain portion of the finely divided meat which adheres to the inner wall of the trough and is located in adjacency thereto, and which is not readily carried to the outer edge of the trough by the rotary action of the knives.

In order to aid the mixing of the finely divided meat with the coarser cut portions of the meat, I provide a deflector 161, which has a wall 162 in adjacency to the knives, and preferably has an inner edge 163 of such form as to substantially contact the inner portion of the wall of the annular trough. It may have an outer flange 164.

The deflector has a laterally bent portion 165, on which part of the contacting edge 163 of the deflector is located for contacting the inner wall of the annular trough. This lateral flange also prevents squeezing of the meat inwardly past the deflector, and, being opposed to the outer ends of the knives, directs the meat toward the knives for action thereon by the knives, to move the meat outwardly in the annular trough.

This flange also serves as a further shield or guard to protect the operator, who is positioned at the opposite side of the central hub, from contact with the knives.

The deflector is also preferably provided with an upper downwardly sloping flange 166 for directing any meat which may move to the upper portion of the deflector back toward the knives.

The deflector is preferably secured to the flange 39, forming the wall of the opening 37 in the cover 29, as by means of screws 167.

There is a passage 169 in the outer portion of the meat-channel formed by the trough and its cover, this passage being located between the outer end of said deflector and the outer wall of the annular trough, through which the meat acted on by the cutters passes. The inner wall of the passage is formed by the deflector and its outer flange. The bottom and outer wall thereof is formed by the wall of the annular trough, and the upper wall is formed by the cover 29.

The cutters are so arranged as to advance or push the meat toward the opening, the cutting edges acting on the meat in sequence from a cutter removed from said deflector toward a cutter more adjacent to said deflector to form a spiral feed for the advancement of the meat toward said deflector. The cutting edges of the knives further act to move the meat from the inner portion of the annular trough toward the outer portion. The meat is thus moved by the cutters outwardly and advancingly so as to push the same through the passage alongside the deflector 161.

While this passage is of smaller cross-section than the cross-section of the trough, it will be understood that the meat is a readily pliable body, the constituents of which are readily shiftable, and the action of the knives at said passage is such as to cause greater speed of movement of the meat at said knives and said passage, so that a given amount of meat which would otherwise fill the trough will be readily moved through the narrower cross-sectional passage owing to the greater speed of the movement of the meat at said passage than the speed of rotation of the meat imparted by the bowl.

This deflector, together with the other deflectors hereinbefore described, as well as the scraper for the bottom of the trough to remove the fatty substances therefrom, aid in conditioning the meat dough, in more rapid reduction of the same by cutting, and in mixing the various ingredients of the meat-dough, for rapid and most efficient operation and production of high grade product.

Having thus fully described my invention, what I claim as new, and desire to secure by Letters Patent, is:

1. In a meat cutting machine, the combination of a main frame having an open forward end, a rotary bowl having an annular meat-trough whose inner face is of arcuate cross-section, an upright shaft extending centrally through said bowl, a bearing for said shaft below said bowl, said bowl extending forwardly of the open end of said main frame, a cross-brace extending above said bowl connecting the forward ends of said main frame, and a bearing for said shaft on said cross-brace above said bowl.

2. In a meat cutting machine, the combination of a main frame having an open forward end, a rotary bowl having an annular meat-trough whose inner face is of arcuate cross-section, an upright shaft extending centrally through said bowl, a bearing for said shaft below said bowl, said bowl extending forwardly of the open end of said main frame, a cross-brace extending above said bowl connecting the forward ends of said main frame, a bearing on said cross-brace above said bowl for said shaft, a cover for the rear portion of said bowl, and supporting means between the forward portion of said cover and said cross-brace for supporting said forward portion above said bowl.

3. In a meat cutting machine, the combination of a main frame, a rotary bowl therein, said rotary bowl having an annular meat-trough whose inner face is of arcuate cross-section and whose forward end extends beyond the forward end of said main frame, said main frame being open-ended at its forward portion, the said bowl extending through said open end, an arch-brace above said bowl connecting the open ends of said frame, a cover for the rear portion of said bowl, supporting means between the forward portion of said cover and said arch-brace, and rotary knives operating in said bowl under said cover.

4. In a meat cutting machine, the combination of a main frame whose forward portion is open-ended, a rotary bowl having an annular meat-trough whose inner face is of arcuate cross-section and whose forward end extends through the forward open end of said main frame, a middle bearing therefor, an upright central shaft extending through said bowl for rotating the same, a bearing under said bowl for said shaft, a cross-brace above said bowl connecting the sides of said main frame at its open end, a bearing thereon for the upper end of said shaft, a cover for the rear portion of said trough, a joint between the outer rim of said bowl and said cover, means for adjusting said first-named bearing for adjusting said joint, and rotary knives operating in the rear portion of said bowl.

5. In a meat cutting machine, the combination of a main frame whose forward portion is open-ended, a rotary bowl having an annular meat-trough whose inner face is of arcuate cross-section and whose forward end extends through the forward open end of said main frame, an upright shaft for said bowl for rotating the same, a cross-brace above said bowl connecting the sides of the main frame at its open end, a bearing thereon for the upper end of said shaft, and oil arresting means for said bearing to arrest the passage of oil toward said bowl.

6. In a meat cutting machine, the combination of a main frame whose forward portion is open-ended, a rotary bowl having an annular meat-trough whose inner face is of arcuate cross-section and whose forward end extends through the forward open end of said main frame, a middle bearing therefor, an upright central shaft extending through said bowl for rotating the same, a bearing under said bowl for said shaft, a cross-brace above said bowl connecting the sides of said main frame at its open end, a bearing thereon for the upper end of said shaft, a cover for the rear portion of said trough, a joint between the outer rim of said bowl and said cover, means for adjusting said first-named bearing for adjusting said joint, rotary knives operating in the rear portion of said bowl, and means for said second-named bearing to arrest the passage of oil toward said bowl.

7. In a meat cutting machine, the combination of a main frame whose forward portion is open-ended, a rotary bowl having an annular meat-trough whose inner face is of arcuate cross-section and whose forward end extends through the forward open end of said main frame, a middle bearing therefor, an upright central shaft extending through said bowl for rotating the same, a bearing under said bowl for said shaft, a cross-brace above said bowl connecting the sides of said main frame at its open end, a bearing thereon for the upper end of said shaft, a cover for the rear portion of said trough, a joint between the outer rim of said bowl and said cover, means for adjusting said first-named bearing for adjusting said joint, rotary knives operating in the rear portion of said bowl, and tension members and spacing parts between said cross-brace and the forward portion of said cover to support said cover from said cross-brace.

8. In a meat cutting machine, the combination of a rotary bowl having an upright axis of rotation and an annular meat-trough whose bottom face is of arcuate cross-section and which surrounds said axis, rotary cutting means whose cutting edges operate crosswise of said trough, a cover for said trough, deflectors in the body of the contents of said trough and a scraper for said bottom face in advance of said deflectors, whereby to maintain the fatty substances of said body which have a tendency to congeal on said bottom face in mixed relation in said body.

9. In a meat cutting machine, the combination of a rotary bowl having an annular meat-trough whose bottom face is of arcuate cross-section, a flexible scraper for said bottom face extending crosswise thereof, and means for adusting said flexible scraper with relation to said bottom face.

10. In a meat cutting machine, the combination of a rotary bowl having an annular meat-trough whose bottom face is of arcuate cross-section, a flexible scraper extending croswise of said meat-trough coacting with said bottom face, means for adjusting said flexible scraper with relation to said bottom face, and deflecting means on said flexible scraper for the contents of said meat-trough.

11. In a meat cutting machine, the combination of a rotary bowl having an annular meat-trough whose bottom face is of arcuate cross-section, a scraper for said bottom face, and deflecting means on said scraper for deflecting contents of said meat-trough.

12. In a meat cutting machine, the combination of a main frame comprising a sector-member, a rotary bowl having an annular meat-trough whose bottom face is of arcuate cross-section, a cover therefor, a scraper for said bottom face, and means for securing said scraper respectively to said cover and said sector-member.

13. In a meat cutting machine, the combination of a main frame comprising a sector member, a rotary bowl having an annular meat-trough whose bottom face is of arcuate cross-section, a cover for said bowl, a scraper for said bottom face, means comprising adjusting means for securing said scraper respectively to said cover and said sector-member, and deflecting means for the contents of said trough for deflecting the portion of the contents scraped by said scraper.

14. In a meat cutting machine, the combination of a bowl having an annular meat-trough whose inner face is of arcuate form in cross-section, a cover therefor, said meat-trough and cover forming a meat-channel, rotary cutting means having cutting edges whose paths are crosswise of said meat-trough, means for rotating said meat-trough crosswise of the paths of said cutting means, said cutting means and meat-trough coacting to feed the meat being cut, and a deflector for the meat at the inner portion of said trough and at the feeding-out end of said cutting means in adjacency to said cutting means, whereby to reduce the cross-sectional size of said channel at the feeding-out end of said cutting means.

15. In a meat cutting machine, the combination of a rotary bowl having an annular meat-trough whose inner face is of arcuate form in cross-section and formed with a central raised portion whose outer periphery forms part of said inner face, rotary cutting means having cutting edges whose paths of rotation are crosswise of said trough, a scraper for said central raised portion in adjacency to said cutting means arranged to deflect the meat outwardly, and a deflector at the outer portion of said bowl for deflecting the meat inwardly.

16. In a meat cutting machine, the combination of a rotary bowl having an annular meat-trough whose inner face is of arcuate form in cross-section and formed with a central raised portion whose outer periphery forms part of said inner face, rotary cutting means having cutting edges whose paths of rotation are crosswise of said trough, a scraper for said central raised portion in adjacency to said cutting means arranged to deflect the meat outwardly, a deflector at the outer portion of said bowl for deflecting the meat inwardly, and deflecting means between said central portion and said outer portion for mixing the meat.

17. In a meat cutting machine, the combination of a rotary bowl having an annular meat-trough whose inner face is of arcuate form in cross-section and formed with a central raised portion whose outer periphery forms part of said inner face, rotary cutting means having cutting edges whose paths of rotation are crosswise of said trough, a scraper for said central raised portion in adjacency to said cutting means arranged to deflect the meat outwardly, a deflector at the outer portion of said bowl for deflecting the meat inwardly, and a scraper and deflectors for the bottom of said trough whereby to scrape the fat from said bottom and mix the same with the body of the meat.

18. In a meat cutting machine, the combination of a rotary bowl having an annular meat-trough whose inner face is of arcuate form in cross-section and provided with a central raised portion whose outer periphery forms part of said inner face, rotary cutting means having cutting edges whose paths of rotation are crosswise of said trough, a cover for said trough in adjacency to said cutting means, and a deflector in said trough coacting with said inner face whereby a meat passage is formed between said deflector, the outer wall of said trough and said cover which is of less dimension in cross-section than the cross-sectional dimension of said trough, and said cutting means formed spiral-like for accelerating the movement of the meat through said passage.

19. In a meat cutting machine, the combination of a rotary bowl having an annular meat-trough whose inner face is of arcuate form in cross-section and surrounds a central raised portion of said bowl whose outer periphery forms part of said inner face, rotary cutting means having rotary cutting edges whose paths of rotation are crosswise of said trough, and a scraper in adjacency to said cutting means provided with a scraping edge coacting with the outer periphery of said raised portion, and said scraper provided with an outer retreating flange for deflecting the meat.

20. In a meat cutting machine, the combination of a rotary bowl having an annular meat-trough whose inner face is of arcuate form in cross-section and surrounds a central raised portion having an outer periphery which forms part of said inner face, rotary cutting means having cutting edges whose paths of rotation are crosswise of said trough and coact with said inner face to cut the meat, and a deflector for the meat having an inwardly laterally extending flange whose edge coacts with said outer periphery in adjacency to said cutting means and having a wall crosswise of the end of said cutting means to form a deflector for the meat acted on by said cutting means.

In testimony whereof, I have hereunto signed my name.

OSCAR C. SCHMIDT.